United States Patent
Alexander et al.

(10) Patent No.: US 7,411,901 B1
(45) Date of Patent: Aug. 12, 2008

(54) METHOD AND APPARATUS FOR DYNAMICALLY SELECTING TIMER DURATIONS

(75) Inventors: Cedell Alexander, Durham, NC (US); Ed Rovner, Chapel Hill, NC (US); Lance Richardson, Chapel Hill, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 993 days.

(21) Appl. No.: 10/096,554

(22) Filed: Mar. 12, 2002

(51) Int. Cl.
   *H04L 12/54* (2006.01)
(52) U.S. Cl. .............. 370/230; 370/235; 370/390; 370/428; 370/473
(58) Field of Classification Search ............ 370/230, 370/230.1, 231, 232, 234, 252, 253, 465, 370/468, 536, 538, 540, 543; 709/230, 231, 709/232, 233, 234
See application file for complete search history.

(56) References Cited

U.S. PATENT DOCUMENTS

| | | | |
|---|---|---|---|
| 5,712,976 A * | 1/1998 | Falcon et al. ............... 725/115 |
| 6,044,081 A * | 3/2000 | Bell et al. ................... 370/401 |
| 6,081,843 A * | 6/2000 | Kilkki et al. ................ 709/232 |
| 6,141,324 A * | 10/2000 | Abbott et al. ............... 370/236 |
| 6,748,481 B1 * | 6/2004 | Parry et al. ................. 711/100 |
| 6,792,449 B2 * | 9/2004 | Colville et al. ............. 709/215 |
| 6,894,974 B1 * | 5/2005 | Aweva et al. ............. 370/230.1 |
| 6,917,614 B1 * | 7/2005 | Laubach et al. ............. 370/392 |
| 6,925,502 B1 * | 8/2005 | Abbasi et al. ............... 709/232 |
| 7,082,142 B1 * | 7/2006 | Begeja ....................... 370/507 |
| 2001/0017844 A1 * | 8/2001 | Mangin ....................... 370/231 |
| 2002/0099806 A1 * | 7/2002 | Balsamo et al. ............. 709/223 |
| 2002/0110139 A1 * | 8/2002 | Boura et al. ................. 370/432 |
| 2002/0112196 A1 * | 8/2002 | Datta et al. ..................... 714/4 |
| 2002/0122385 A1 * | 9/2002 | Banerjee ..................... 370/229 |
| 2002/0186660 A1 * | 12/2002 | Bahadiroglu ................ 370/248 |
| 2003/0014628 A1 * | 1/2003 | Freed et al. .................. 713/155 |
| 2005/0058073 A1 * | 3/2005 | Ayyagari et al. ............ 370/236 |
| 2005/0058144 A1 * | 3/2005 | Ayyagari et al. ............ 370/401 |

FOREIGN PATENT DOCUMENTS

| WO | WO000213398 | * | 2/2002 |
| WO | WO000213440 | * | 2/2002 |
| WO | WO000213441 | * | 2/2002 |

* cited by examiner

*Primary Examiner*—Edan Orgad
*Assistant Examiner*—Salman Ahmed
(74) *Attorney, Agent, or Firm*—Blakely Sokoloff Taylor & Zafman LLP

(57) ABSTRACT

A data communication system dynamically selects timer durations to ensure delivery of data at a desired bit rate. A source or proxy source transmits data, such as streaming media, to a destination according to a dynamic bit rate timer, where the timer regulates the transmission frequency and/or the packet size of the data being transmitted. The timer dynamically adapts the transmission frequency or packet size according to the relative positioning of data pointers in a buffer and effectively changes the rate of data delivery. In this way, data may be delivered at the desired average bit rate to the destination despite network capacity fluctuations.

14 Claims, 10 Drawing Sheets

METHOD AND APPARATUS FOR DYNAMICALLY SELECTING TIMER DURATIONS

FIELD OF THE INVENTION

The present invention relates to the architecture and operation of data networks. More particularly, the present invention relates to improving the timing of data delivery so that the data is available at a designated rate.

BACKGROUND OF THE INVENTION

Connectionless or packet-switched networks, such as the Internet, transmit data between network devices in packets. The packets may be fixed length or variable length units of data of a certain number of bytes as may be required by the underlying communications media or protocol via which the packets are transmitted. The network addresses of the source network device ("source") and of the destination network device ("destination") are added to each packet (excluding multicast or broadcast packets). A network device is generally an electronic device such as a network switch, server, workstation, desktop computer, personal digital assistant, mobile or laptop computer, cellular or mobile telephone, printer, database, etc., that is accessible by or over a network. Packet addressing in a connectionless network allows multiple connections to concurrently communicate between various source and destination devices, a significant advantage over circuit-switched or connection-oriented networks.

Often when an application requires large quantities of related data to be sent between communicating devices the data is sent as a series of packets known as a data stream. The number of packets in a stream varies widely from a few packets to thousands or more depending on the type and length of content of the data.

Unfortunately, as streaming activity across the connectionless network increases, the available network capacity between a specific source and destination may decrease. The result of this reduced capacity is that the source and destination must often wait before they can send additional packets. Furthermore, within the connectionless network environment, packets can be delayed, lost, damaged, delivered out of order, duplicated, and destroyed thereby making the task of successfully streaming data across the network even more difficult. Delays introduced during periods of network congestion or device failures can create significant problems for applications that require the data streams to be transmitted at a designated rate. Applications that provide streaming media services are also highly dependent on a reliable data delivery rate.

To avoid interruptions during playback of streaming media, an application may attempt to determine the available network capacity prior to establishing an initial data connection with the source. The application may even provide a buffer at the destination to help absorb network delays inherent in the Internet. Unfortunately, even a buffered application may not be able to adjust to delays or congestion introduced onto the network after the initial data connection has been made. Furthermore, most applications are limited to adjustments that can be made without negatively affecting playback at the destination because of the difficulty in making mid-stream adjustments. What is needed is a data communication system that maintains the overall rate of data transmission to a destination network device despite fluctuating network capacity.

SUMMARY

The present invention relates to dynamic selection of timer durations in a data communication system enabling delivery of data at a desired rate. Thus, a preferred embodiment of the present invention provides a source (i.e., a server or network switch) that transmits data, such as streaming media, to a destination (i.e., a client) via a network switch according to a dynamic rate. A timer, for example, a bit-rate timer, adjusts the dynamic rate during transmission. During transmission, the timer may directly or indirectly regulate the transmission frequency and/or the packet size of the data being transmitted. The bit-rate timer dynamically adapts transmissions by a network switch according to the relative position in a circular buffer of a client pointer with respect to the position of a new data pointer. Thus, the bit-rate timer helps to maintain a desired or consistent bit rate by dynamically adapting various transmission characteristics, such as transmission frequency or packet size, during the course of data stream transmission across the connection. Adapting the transmission includes changing the transmission frequency, packet size, or combination thereof, which effectively changes the rate of data delivery.

In one exemplary configuration, new data from a source, such as a server, is written to the buffer at a location indicated by a new data pointer position. Similarly, data being sent to a destination via a communications network, such as the Internet, is drawn from the buffer location indicated by a client pointer. Upon receiving or developing additional data, a filled circular buffer writes over the oldest data with the newest data and directs the newest data pointer to the new location within the buffer. A bit-rate timer, associated with the buffer, dynamically adapts transmissions according to the relative position of the client pointer with respect to the position of the new data pointer. Exemplary dynamic adaptations include decreasing either the transmission frequency or the packet size upon determining that the client pointer is too close to the new data pointer or increasing either the transmission frequency or the packet size upon determining that the client pointer is too far from the new data pointer. In a scalable configuration, the buffer maintains specific streaming connections with multiple destinations via a plurality of client pointers, each client pointer indicating where within the buffer the next packet of data for a respective connection is found.

Another exemplary configuration adapts the timer according to a first threshold and a second threshold associated with a circular buffer. In a similar manner to the aforementioned pointers, the first and second thresholds are adjusted or reset relative to the position of the newest data in the buffer. These thresholds indicate when the bit-rate timer should dynamically adjust transmission characteristics, thereby helping to maintain the desired delivery rate. More specifically, when buffer utilization exceeds the first threshold, indicating that data is being transmitted substantially faster than the desired rate, the timer decreases either the transmission frequency or the packet size. Furthermore, when the buffer utilization falls below the second threshold, indicating that data is being sent substantially slower than the desired rate, the timer increases the transmission frequency or packet size. In this way, the timer dynamically adjusts delivery of the data and increases the chances that data will be available at a desired rate without interruptions to negatively affect playback.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE INVENTION

A method and apparatus for dynamically selecting timer durations is described, in which the delivery of data, such as streaming media (e.g., audio or video data), is adapted to provide reliable data delivery at a designated rate. Thus, a preferred embodiment of the present invention provides a source (i.e., a network switch or a server) that transmits data, such as streaming media, to a destination (i.e., a client) according to a dynamic rate timer (i.e., a bit-rate timer) where the timer regulates the transmission rate of the data being transmitted. The transmission rate may be adapted by changing various transmission characteristics, such as transmission frequency and/or the packet size.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
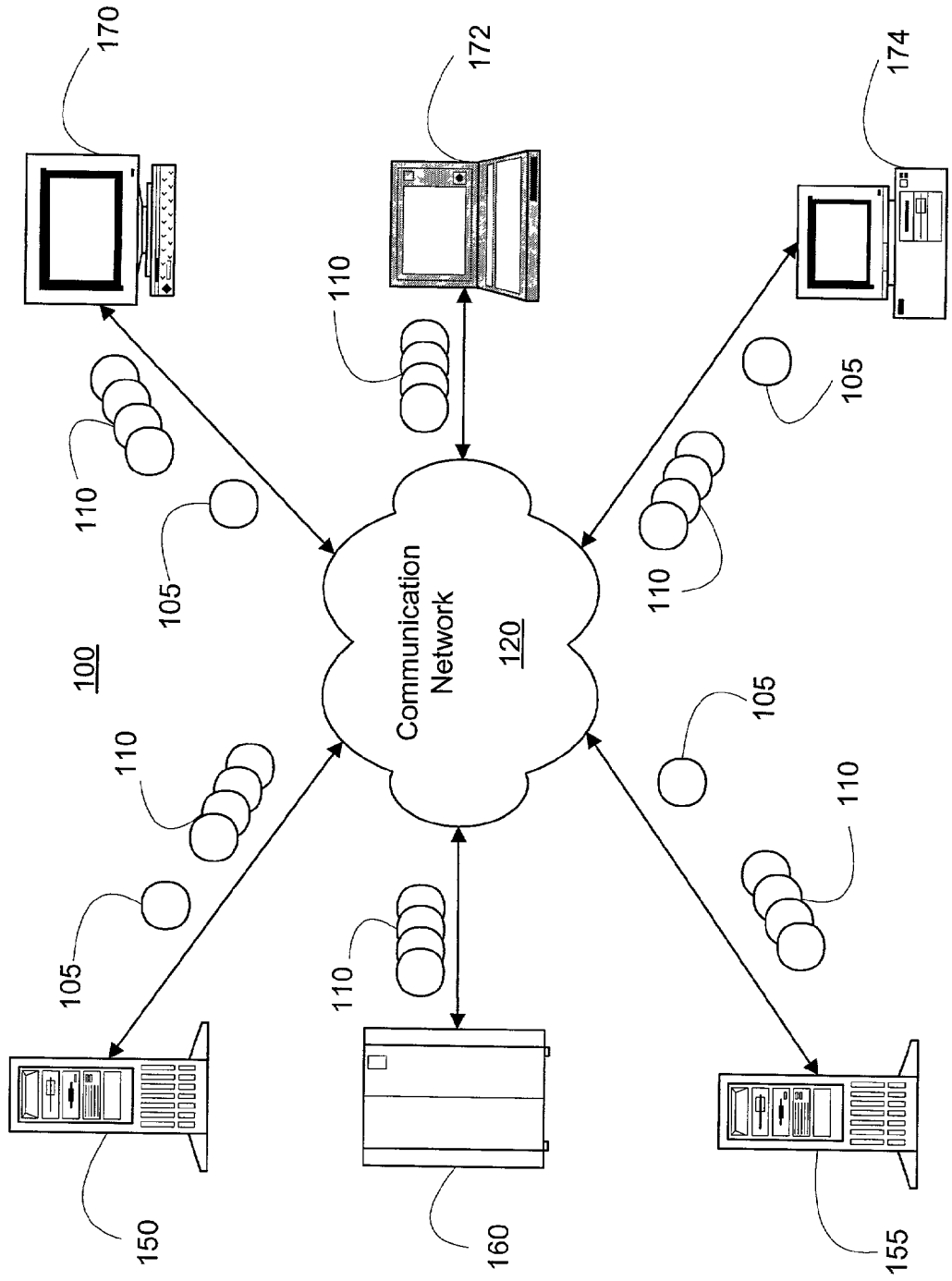
FIG. 1 illustrates a network environment suitable for implementing the invention.

FIG. 1 and the following discussion are intended to provide a brief, general description of a suitable networking architecture and environment 100 in which the invention may be implemented. The illustrated network architecture 100 contemplated in the illustrated embodiment of the invention provides a scalable, low cost solution to distribute data packets 105 or streaming media 110 (a "stream") across a communication network 120. Moreover, those skilled in the art will appreciate that source network devices 150-160 and destination network devices 170-174 may be practiced with other network device configurations. Additionally, the invention may be practiced with other source and destination network devices, including network switches, servers, hand-held devices, multiprocessor systems, programmable or configurable consumer electronics, network PCs, minicomputers, mainframe computers, personal computer systems and the like. Embodiments of the invention may also be practiced using different forms of data, including but not limited to data packets 105 and streaming media 110. As with other data, the network architecture 100 allows streaming media 110, such as video, audio, and live events to be downloaded over a communications network 120, such as the Internet, to destination network devices 170-174. Applications such as video on demand and Internet radio are two common examples of downloading streaming media 110 over the Internet.

The streaming media content, e.g., music, typically is input and stored on one or more network devices commonly known as a source or server ("source"). A source, such as server 150, provides or sources continuous multimedia stream 110. The source is coupled to communication network 120. Upon making a request, the requesting network device 170-174, also commonly known as a client or destination ("destination"), sends a first message to the source with a synchronization request. The destination receives a second message from the source, which provides an acknowledgment response, a synchronization request, and a proposed maximum segment size. Finally, the destination sends a third message including an acknowledging response that the connection is established. Once the connection is established, the streaming media 110 is then downloaded to the requesting destination according to the parameters previously provided. Multiple destinations, such as network devices 170-174, coupled to communication network 120, either directly or via an intranetwork, may concurrently receive streaming multimedia 110 from a single source 150.

In some instances, many thousands of clients connect to a given server and request downloading the streaming media 110. One method of reducing the load on the server in such a situation is to transmit the streaming media 110 from a server 155 to a network switch 160. The network switch 160 receives a data packet 105 and recognizes the data packet 105 as belonging to a stream 110. In response to recognizing the packet as belonging to a stream 110, the network switch 160 directs the data packet to a stream-processing module in the network switch 160. The stream-processing module further identifies the source of the stream (i.e., server 150 or 155) to which the data packet belongs; and stores the data packet in an associated buffer for later transmission, as controlled by the stream-processing module, to a destination (i.e., a client 170-174) for the stream. In this way, the network switch 160 is also a source, as the stream 110 may be replicated and transmitted by the stream-processing module any number of times to multiple destinations in a fast, efficient, cost-effective manner.

Figure 2:
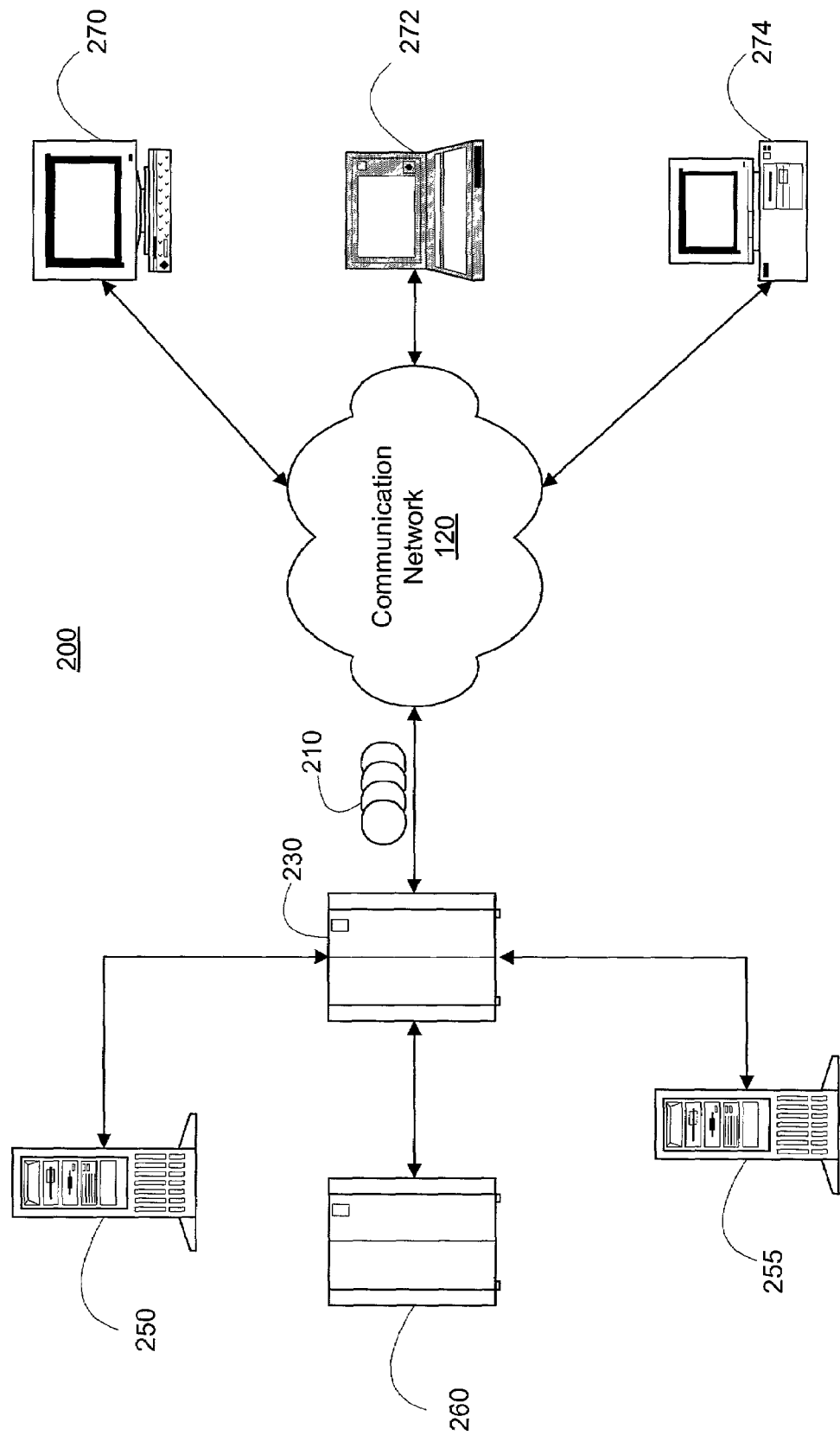
FIG. 2 illustrates a network environment according to one embodiment of the invention.

With reference to FIG. 2, a block diagram is provided of the network and network switch hardware system 200 as contemplated in an embodiment of the invention. The illustrated system 200 provides a fast, efficient, highly scalable, low cost solution to distribute streaming media (a "stream") 210 in a one-to-many network environment. As previously mentioned, one method for transmitting a stream 210 over a network 120 to multiple client destinations 270-274 involves transmitting a unicast stream from a source, such as a server 250 or a network switch 260, to a network switch 230 ("switch"), buffering the unicast stream at the switch 230, splitting that unicast stream at the switch 230 into multiple unicast streams, and transmitting the multiple unicast streams to multiple client destinations 270-274, typically at the request of those clients. In one configuration, the switch 230 may receive a plurality of data packets from multiple sources, such as servers 250 and 255 and/or network switch 260, buffering a unicast stream at the switch 230, splitting that unicast stream at the switch 230 into multiple unicast streams, and transmitting the multiple unicast streams to multiple client destinations 270-274

In general, a switch 230 or 260 is a network device that selects a path over which to transmit a unit of data to its next destination. According to the International Standards Organization (ISO) layered Open Systems Interconnection (OSI) communication model, a switch is usually associated with layer 2, the Data-Link Layer. However, switches also perform the routing functions of layer 3, the Network Layer. Layer 3 switches are also sometimes called Internet Protocol (IP) switches. More recently, switches perform routing functions based on layer 4, the Transport Layer, e.g., based on Transmission Control Protocol (TCP) information, which may even involve the switch establishing a Transport Layer connection with the source and/or ultimate destination of a stream. As previously discussed, a switch equipped with a stream-processing module or a Streaming Media Accelerator (SMA), can buffer, replicate, and transmit a stream. An example of an SMA equipped switch includes the BlackDiamond® modular chassis switch available from Extreme Networks, Inc., of Santa Clara, Calif., the assignee of this patent application.

A communications protocol suite, such as the Transmission Control Protocol/Internet Protocol (TCP/IP) suite of protocols, is used to carry a stream 210 from a server to multiple clients via a network switch. The TCP/IP suite of protocols, in particular, is used in one embodiment of the invention because the protocol suite guarantees ordered delivery and retransmission of data packets, as necessary.

It should be noted that the term unicast, or unicast communication, generally refers to a communication between a single sending network device (e.g., a server) and a single receiving network device (e.g., a switch or client) over a network. Unicast communication is in contrast to multicast communication between a single sender and multiple receivers. The term point-to-point communication is sometimes used to indicate unicast communication. The term stream, as used hereinafter, refers to a single unicast stream, and the term "streams" refers to multiple unicast streams, unless specifically stated otherwise.

Multiple servers, such as servers 250 and 255 provide or source continuous multimedia streams 210. Also the streams 210 are provided as input to the network switch, or simply, switch, 230. In one embodiment, the servers 250, 255 and the network switch 260 are coupled to the network switch 230 via a dedicated network. The network switch 230 is coupled to communication network 120, either directly, or via an internetwork.

In one embodiment, network switch 260 may also provide or source streams 210 to network switch 230. This configuration provides even greater scalability for transmitting the stream and further minimizes processing overhead at the original server or source. The connection between the network switch 260 and the switch 230 may be a connection specific or connectionless network. Regardless of the connection type, the network switch 260 should also convey the desired rate of transmission for the stream 210 to the switch 230. In this manner, popular streams may be replicated to multiple SMA enabled switches and each switch may dynamically adapt the streams 210 for which it is a proxy source.

Multiple client destinations, such as client destinations 270-274, receive continuous multimedia streams from switch 230. These destinations are likewise coupled in communication, either directly, or via an internetwork, with switch 230. The streams are output from the switch 230 and received at the destinations. While only three destinations are depicted in FIG. 2, in a typical environment, the number of destinations far surpasses the number of servers. For example, the number of destinations is one or more orders of magnitude greater than the number of servers. As a reference point, the number of servers in one configuration may be 100, while the number of destinations may be over 20,000, with each destination receiving one of one hundred, possibly concurrent, multimedia streams from the network switch 230. Those of skill in the art will appreciate that each multimedia stream may be transmitted at different rates depending on the connection to the communication network 120, including for example 128 kilobits per second (128 Kbps) or 512 Kbps. A connection across the Internet will have many sections or segments that have different performance parameters, such as a path MSS. In some situations, the connection path is more of a limiting factor than the data to be transmitting across the connection.

In system 200, the network switch 230 acts as a proxy for the one or more servers streaming media to the multiple clients. Each server transmits a stream to the switch 230, which the switch then buffers, and retransmits as the proxy source to a client destination. The switch 230 may also monitor buffer utilization and dynamically adapt not only the stream from each server to the switch 230 but also the streams between the switch 230 and the client destinations. The same stream may be dynamically adapted or retransmitted multiple times during the connection between the switch and the different clients. This is one of the main advantages of the proxy server switch illustrated in system 200 versus other architectures where multiple clients directly maintain multiple streams with a server. The proxy architecture used in system 200 shifts processing overhead, related to maintaining multiple streams, away from the server to the switch 230. Using the switch 230 as a proxy for a server 250, the server 250 need only maintain a small number of streams to the switch 230, and the switch 230, with its architecture optimized to support many multiple streams, may maintain orders of magnitude more streams with the destinations 270-274. In the role of proxy for the server, the switch 230 may also dynamically adjust the streams to different clients based in part on the buffer utilization by each client stream and the relative desired bit rate for the client connection.

In one embodiment, the switch 230 maintains separate Transport Layer communications with each client destination 270-274, as well with each server 250-255, so that servers and clients communicate directly with the switch 230, not with each other. For example, a server 250 and the switch 230 may establish a separate TCP session to transmit a stream 210 from the server 250 to the switch 230, and the switch 230, in turn, may establish separate TCP sessions, one with each client destination 270-274, to transmit to the clients duplicate copies of the same stream 210 received from the server 250, in response to requests from the clients 270-274 to receive the stream 210. This enables the transmission rate of each stream 210 to be dynamically adjusted according to the connection characteristics of each client. Likewise, switch 260 may also act as a source for stream 210 to switch 230.

Figure 3:
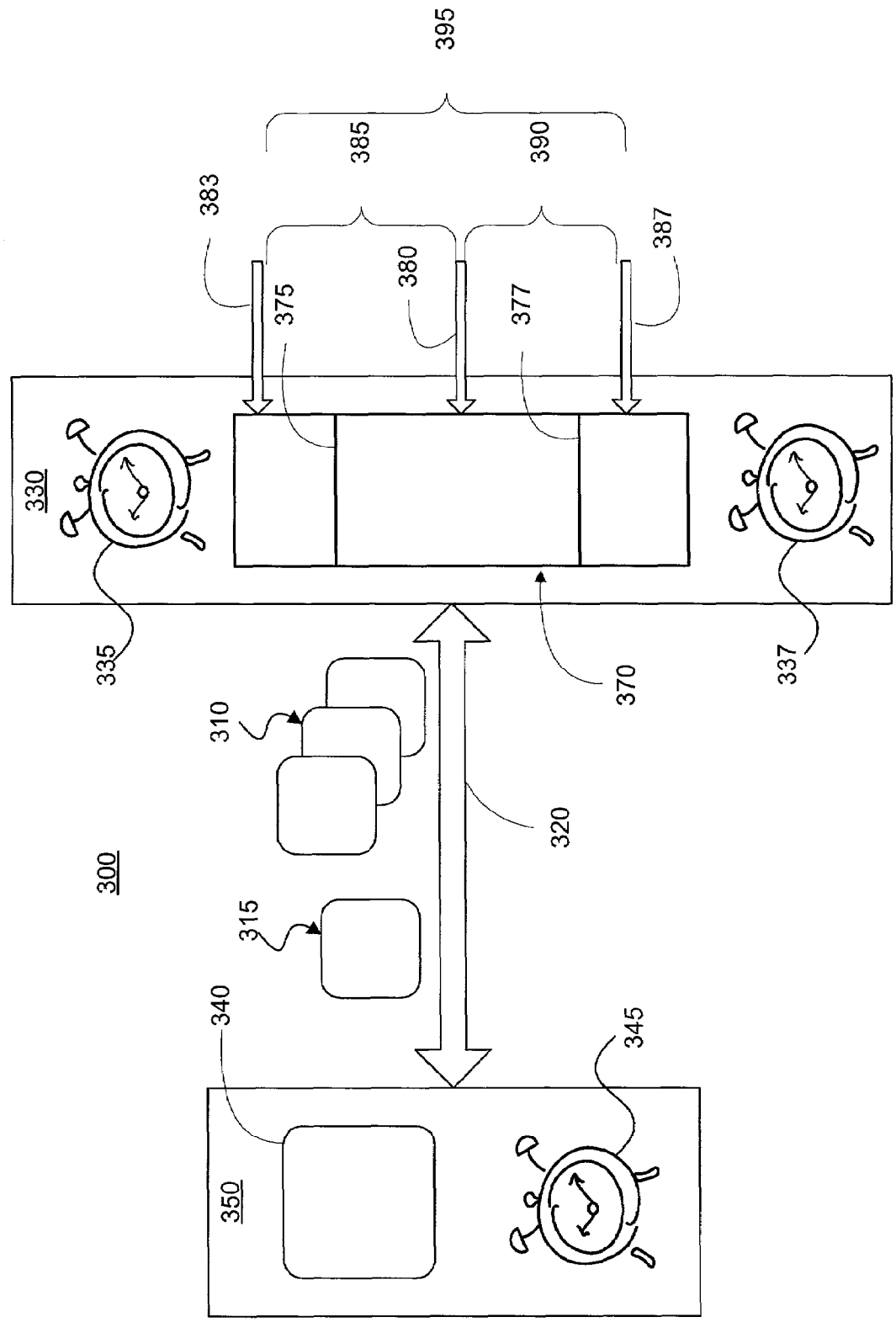
FIG. 3 is a block diagram of dynamic timer hardware architecture according to one embodiment of the invention.

FIG. 3 illustrates a block diagram of dynamic timer hardware that enables source to network switch communication. The dynamic timer architecture 300 is provided as contemplated in one embodiment of the invention. The architecture 300 includes streaming data 310 being sent and received via a network 320 established between a network switch 330 and a source 350. The network 320 may also deliver individual data packets 315 that are later combined at switch 350 into streams 310. The network 320 may consist of a connectionless or connection specific network between the network switch 330 and the source 350. For example the communication network 320 may include configurations, such as a private network, a dedicated network, Internet, intranet or combination thereof.

The streaming data 310 on the source 350 is generally transmitted from memory 340 at a desired bit rate regulated by a desired bit rate timer 345. The network switch 330 includes a bit rate timer 335, a desired stream rate timer 337 and a buffer 370 having a first threshold 375 and a second threshold 377. Buffer 370 may be configured in a variety of ways depending on the application requesting the data 310. In one configuration, data pointers 380, 383, and 387 provide the switch with dynamic reference points to buffer 370. The thresholds and data pointers facilitate monitoring of buffer utilization and performance.

As the number of packets in a stream varies widely from a few packets to thousands or more depending on the type and length of content of the data, so too varies the configuration of the buffer 370. Depending on the size of the buffer and the size of the streaming data to be transmitted and received, various configurations can be used at the switch 330 to store the streaming data efficiently. In one configuration, optimized for real-time playback, the buffer need not hold hours of data, rather it should maintain an adequate buffer size to maintain a real-time stream at the desired rate through its slowest client destination connection. Another configuration used for a music file may contain the entire stream. In yet another configuration, the buffer 370 may be a circular buffer used for continuous streaming audio or video data. Even the configuration of the thresholds within the buffer 370 may also vary in location and type. For example, some applications and configurations may only require a single fixed threshold, while other applications require dynamically adjustable thresholds.

As previously discussed, the buffer 370 may also reference data locations via data pointers 380, 383, and 387. For example, data pointer 380 may indicate the location of the last data sent to a client destination or the next data to be sent. In one configuration, where the entire data stream fits into the buffer, data pointer 387 could indicate the end of data and data pointer 383 the start of data. As such the two data pointers 383 and 387 define the stream within the buffer. Another buffer configuration might use data pointer 383 to define the newest data in a circular buffer while data pointers 380 and 387 indicate the locations within the buffer of the next data to be sent to their respective client destinations.

Figure 4:
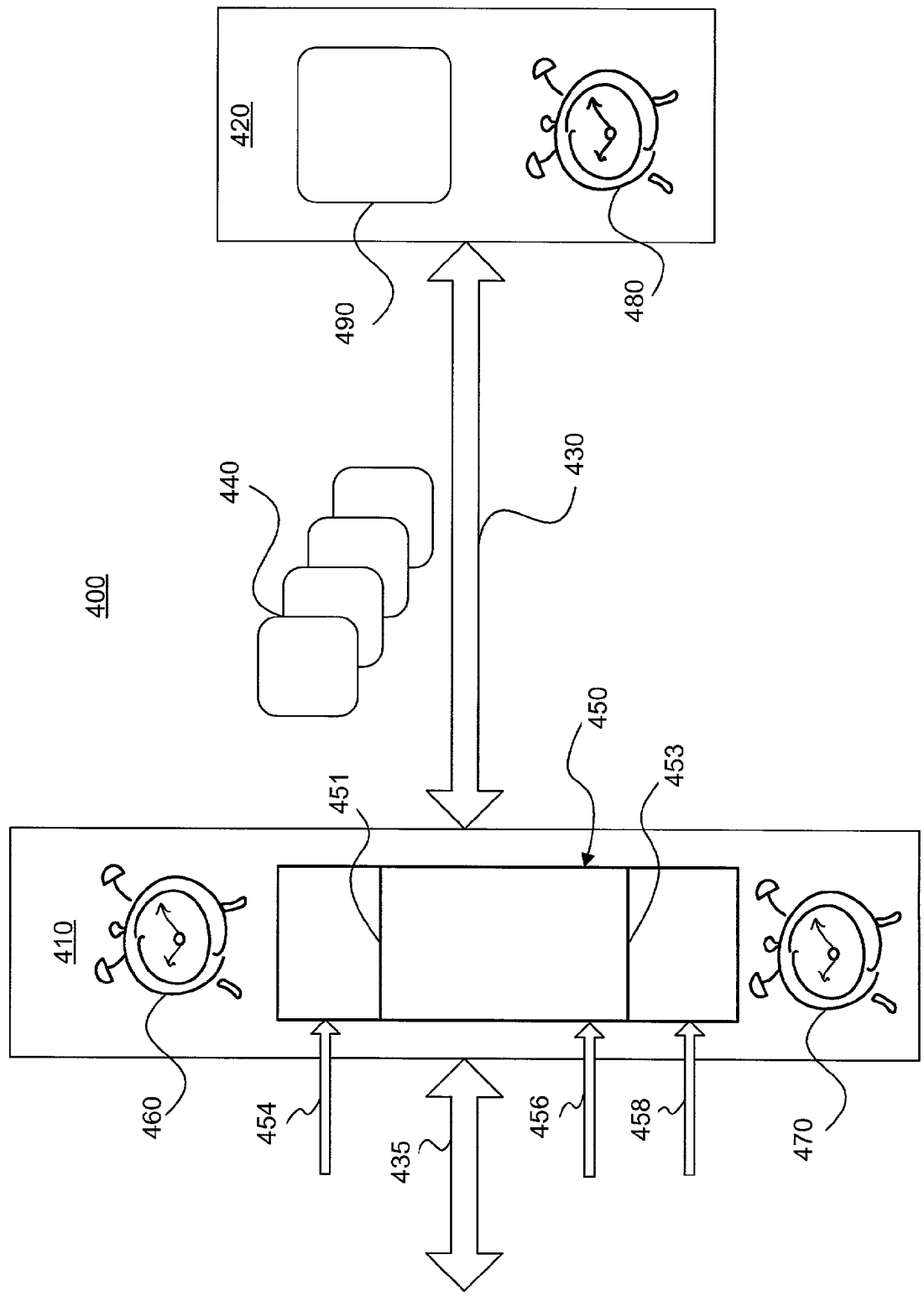
FIG. 4 is a block diagram of dynamic timer hardware architecture according to one embodiment of the invention.

FIG. 4 illustrates a block diagram of a source 410 communicating with a client destination 420 via a communication network or channel 430. Data 440 transmitted from a buffer 450 is regulated according to a bit rate timer 460. The buffer 450 is configured with a first threshold 451 and a second threshold 453 to provide indications of performance. Specifically, how effective is the base rate in conjunction with data delivery across the communication channel to the destination 420. The buffer 450 illustrated in FIG. 4 also includes data pointers 454, 456, and 458. The data pointers 454-458 assist the source 410 in managing and manipulating data within the buffer 450. The buffer 450 may be configured in a wide variety of different structures, such as a circular buffer, LIFO, FIFO, etc. according to data type to be transmitted as is clear to one of ordinary skill in the art. The bit rate timer 460 typically operates at a base rate that is generated in part according to a desired bit rate 470 for the data 440. In one configuration, the destination 420 also maintains a desired bit rate timer 480 for comparison with actual transmission and playback results. Memory 490 provides operation storage space on the destination 420 to receive data 440 and in some cases buffer playback of streaming media.

As previously discussed, when creating a connection between source 410 and a destination 420 across the communication channel 430, the source 410 negotiates a maximum segment size ("MSS") with the client destination 420. The source 410 uses the MSS along with the desired bit rate associated with the streaming data to determine a base rate for transmissions with the client destination 420. If the average transmission and playback rate falls below the desired bit rate 470, the source 410 adapts the bit rate timer 460 to increase the base rate until transmission reaches acceptable performance levels.

In situations during transmission where the transmission rate does not meet the desired rate, the base rate is adapted by the bit rate timer 460 according to network congestion, load on the network device, data delivery acknowledgements received, and other similar extraneous factors which affect the transmission rate. In one configuration using standard Transport Control Protocol (TCP) communications, the source 410 also receives a receive window size from the client destination 420, which may also alter the bit rate timer 460 during transmission. In another configuration where the network is using TCP, the destination 420 sends desired adjustments to the source 410 by changing the available window size field in TCP headers sent to the source 410. Similar adjustments may also be made if the destination's memory 490 risks overflow by reducing the available window size, thereby indirectly requesting that data packets be smaller and/or sent less frequently by the source 410.

In one embodiment, source 410 is a network switch that initially receives data 440 via communication channel 435. Once the source has identified the data 440 as belonging to a stream it places the data 440 into the buffer 450. Buffer 450 allows applications running on the destination 420 to enjoy a continuous stream even when there are minor latency variations across the communications network 430. Generally, filling the buffer 450 as quickly as possible gives a better user experience. To accomplish this, one configuration allows the source 410 to send streaming data 440 to the destination 420 at a rate that is a multiple of the base rate. The source 410 continues to deliver data 440 at this higher rate until receiving an indication that a first threshold 451 has been exceeded. If the data is transmitted too fast a second threshold 453 may be exceeded, thereby triggering a reduction in the base rate.

The amount of data 440 necessary for the indication to be sent is determined by the number of seconds specified by a time argument set by the originating application, the destination's abilities, or by a default time argument. For example, a time argument of zero might indicate that no data need be buffered. The higher rate is calculated as a multiple of the average reception rate of the subscribed stream and the configured buffer multiplier. For example, if the default buffer time is 2 seconds, the buffer rate multiplier is 3, and the average reception rate of the stream is 128 kbps, then the source 410 attempts to send the destination 430 about 32 KB of data at 384 kbps.

In addition to the higher rate used to increase the buffer 450 utilization, the present invention also allows the source 410 to dynamically regulate the data transmission after the channel has been created. For example, when a stream is established using TCP, the stream may be dynamically adjusted via increases or decreases in transmission frequency.

Scalability of the delivery engine is very important with streaming real-time applications, such as radio, stock quotes, television, and the like. One network device that satisfies the demand for scalability in streaming media is a switch equipped with a Streaming Media Accelerator (SMA) that can optimize delivery of streaming media to multiple clients. For example, in one embodiment a network switch receives a data stream from a broadcast server. Upon recognizing the data as streaming data, the switch redirects the data stream to a circular buffer. The rate at which the data stream is received from the server becomes the desired rate or base timer rate against which optimal performance per connection is calculated. Delivery of the streaming data to the client from the switch is paced via dynamic calculation of the transmission frequency. The pacing of the data stream may also be dynamically determined based on the relative position of a connection or client pointer in the circular buffer with respect to at least one data pointer. Performance thresholds within the circular buffer may also be established relative to the various data pointers.

Figure 5:
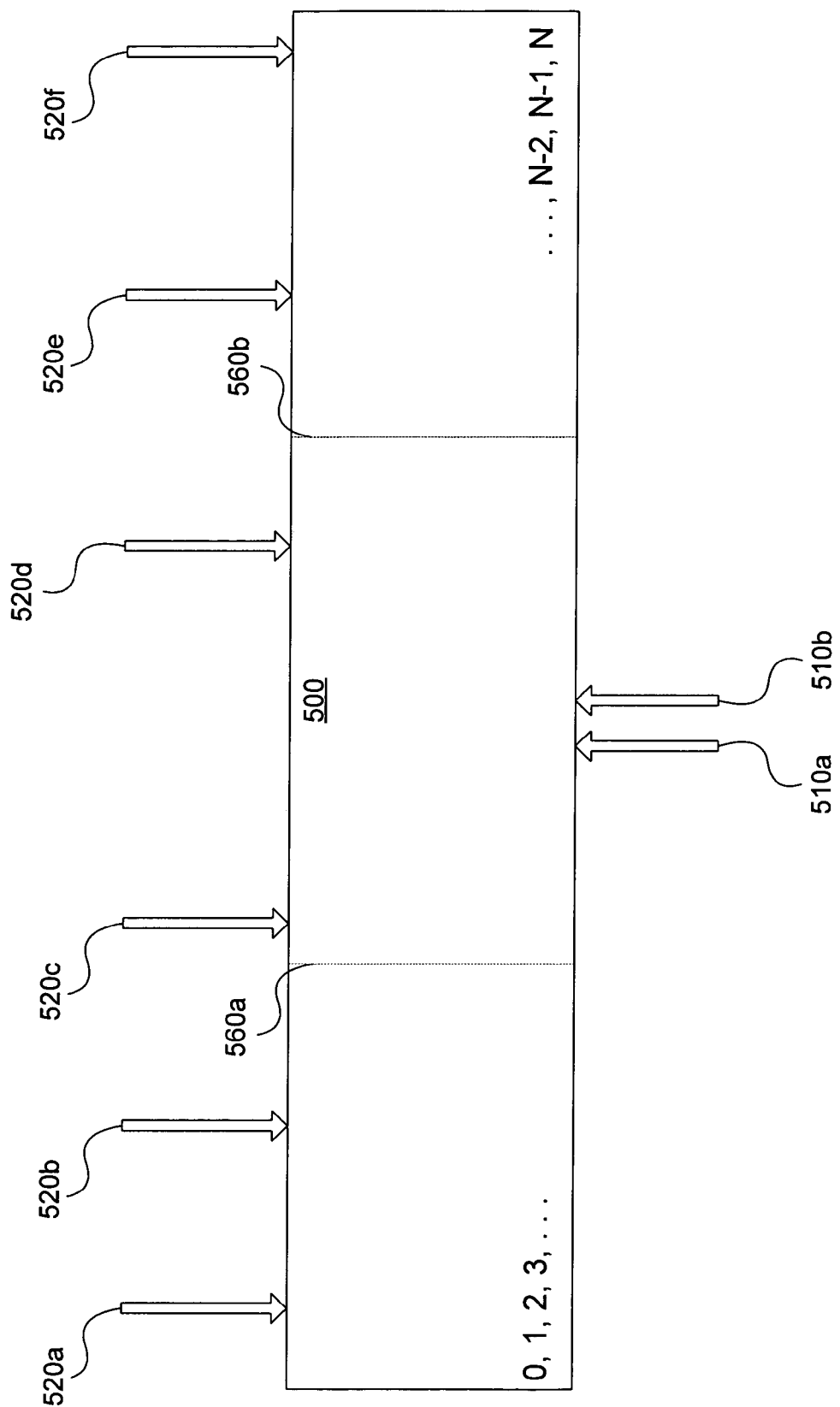
FIG. 5 is a conceptual illustration of a circular buffer.

FIG. 5 is a conceptual illustration of a circular buffer 500 according to one embodiment of the invention. In a network switch environment that accelerates streaming data it is often desirous to store the last N data packets of the stream as data inside a circular buffer 500. A buffer based configuration allows the streaming data to be monitored, duplicated, and transmitted continuously with minimal processor overhead. As streaming data packets are received at the network switch from the source, the data is redirected to fill a circular buffer 500 and when the buffer is full, the newest data overwrites the oldest data temporarily stored in the buffer. Circular buffers logically "wrap" around to the beginning once the allocated space within the buffer is filled with data, so that the oldest data in a filled circular buffer is overwritten upon receiving new data. The circular buffer configuration is particularly useful in conjunction with a Streaming Media Accelerator (SMA), as packets from a stream can be stored consecutively and multiple connections with destinations can be monitored.

The circular buffer configuration illustrated in FIG. 5 also includes various data pointers that enable streaming data contained in the buffer to be replicated and transmitted to multiple client destinations efficiently. Exemplary data pointers include a newest data pointer 510a, an oldest data pointer 510b, and connection or client pointers 520. The newest data pointer 510a indicates where new data starts within the circular buffer. In one configuration where the circular buffer is filled, the newest data is written to the same location as the oldest data pointer and the newest data pointer 510a is redirected to the buffer location indicated by the oldest data pointer 510b prior to reassigning the oldest data pointer 510b to the next oldest data.

The newest data pointer 510a is a useful reference when creating a new connection with a client and in evaluating an established connections performance. When the circular buffer 500 is not completely filled the oldest data pointer 510b indicates where the oldest data in the buffer is located. This is another useful reference point for the client pointer 520, especially as the relative proximity of the client pointer 520 to the oldest data pointer 510b may indicate the need to change the transmission characteristics. For example, if the client pointer 520 is too close to the oldest data pointer 510b there is a likelihood of new data overwriting the next desired data in the client stream. To avoid interrupting playback of the stream a change in the pacing of the transmission may be warranted, such as an increase in the transmission frequency. Similarly, if the client pointer 520 is too close to the newest data pointer 310a, then the network switch may want to reduce the transmission rate and/or frequency with the client destination. Client pointers 520 are destination specific and indicates which data was last transmitted from the buffer to the associated destination. As the client pointers are updated with each transmission, midstream dynamic adjustment of the transmission characteristics of a given communication channel is possible.

In one embodiment, various thresholds 560 are established relative to a newest data pointer 510a. Yet another configuration utilizes a combination of pointers within the circular buffer, including the newest 510a and oldest data pointers 510b, to establish a first threshold 560a and a second threshold 560b. These thresholds 560 may indicate performance of the communication channel and are generally set at multiples of the connections maximum segment size. For example, client pointers 520a, 520b, 520e, and 520f may all wall within acceptable performance standards as they fall between the first threshold 560a and the second threshold 560b. However, as the client pointer 520c is between the first threshold 560a and the newest data pointer 510a, this may indicate that connection associated with client pointer 520c is transmitting faster than the buffer 500 is receiving the data. While the connection associated with client pointer 520d is transmitting too slow, because it falls between the oldest data pointer 510b and the second threshold 560b. While only two thresholds are illustrated in FIG. 5, it is understood to those of skill in the art that various thresholds may be employed to enhance the overall performance and efficiency of the circular buffer 500.

For example, in a configuration that employs prebuffering with new connections, prebuffering thresholds may indicate where a requested connection should start and/or stop transmitting data at an accelerated prebuffering rate. In such a configuration, after initializing a new connection between a client destination and the network switch, the switch enters a prebuffering state during which the data in the circular buffer is transmitted to the client at an accelerated rate. Upon a connection event, such as a timer expiration, the switch checks whether a connection pointer for the new data stream is still within the prebuffer state or prebuffer zone.

Turning now to FIGS. 6-10, the particular methods of the invention are described in terms of computer software and hardware with reference to a series of flowcharts. The methods to be performed by a network device constitute state machines or computer programs made up of computer-executable instructions. Describing the methods by reference to a flowchart enables one skilled in the art to develop such programs including such instructions to carry out the methods on suitably configured network devices (the processor of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a network device causes the processor of the computer to perform an action or a produce a result.

Figure 6:
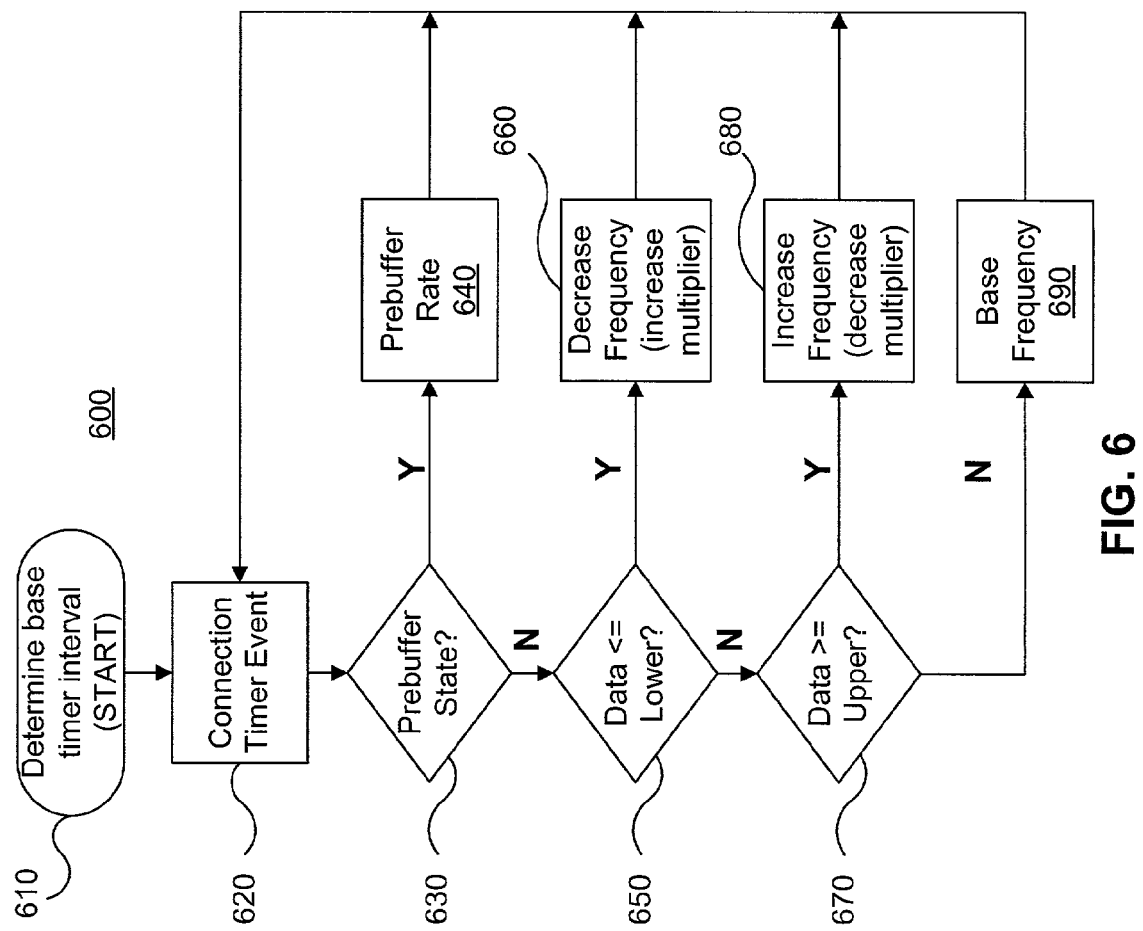
FIG. 6 is a flow chart of data pointer based programming for adapting a bit-rate timer.

FIG. 6 illustrates a data pointer based process 600 for adapting a bit rate timer. Upon receiving a new connection requesting the stream, initialization block 610 determines the base timer interval for transmission. Typically, the base timer interval is computed from the average bit rate for the stream and the MSS for the connection. For example, if the MSS for the connection is 1024 bytes and the average bit rate is 128 kbps then the base timer interval would be 64 milliseconds. (Base Timer interval=MSS/Average Bit Rate).

Once the base timer interval is computed, execution block 620 computes the transmit timer at each per-connection timer event. Exemplary timer events include the expiration of the timer, reception of an acknowledgment packet from the destination, reception of a data packet from the source, various network switch timer interrupts, and the like. In the embodiment illustrated in FIG. 6, the transmit timer interval is initially computed from the base timer interval, the state of the process, and the amount of data available to send to the client.

Each connection is monitored for a connection timer event, upon receiving the connection timer event, the process 600 determines whether the transmit timer interval needs to be adapted. For example, if query block 630 determines that the process 600 is in a prebuffering state, then execution block 640 sets the next interval for the transmit timer to the prebuffer rate. This may be computed by dividing the base timer interval by a prebuffering rate multiplier. When the prebuffering rate multiplier is a positive integer, the transmission frequency is increased because the transmit timer interval is reduced. Once the transmit timer interval is set to the prebuffering rate, the process 600 returns to execution block 620 in preparation for the next timer event.

Once query block 630 determines that the process 600 is not in a prebuffering state, query block 650 determines whether the client pointer, which indicates the location of the next data available to send, is less than or equal to the position of the lower threshold. If the client pointer is within the zone marked by the lower threshold then the transmit timer interval is increased in execution block 660, thereby reducing the transmission frequency. In one configuration, the new transmit timer interval is computed by multiplying the base timer interval by a timer increase multiplier. This timer increase multiplier may be a set integer value or a variable value optimized for the particular connection and destination. Once the new transmit timer interval is computed process 600 returns to execution block 620 until the next timer event.

If query block 650 determines that the client pointer is greater than the lower threshold, and thus outside of the zone marked by the lower threshold, query block 670 determines whether the client pointer is greater than or equal to the position of an upper threshold. If the client pointer is within the upper zone marked by the upper threshold the transmit timer interval is decreased in execution block 680 and returns to execution block 620. The reduction in the transmit timer interval increases the transmission frequency. One configuration computes the new transmit timer interval by multiplying the base timer interval by a timer decrease multiplier, where the multiplier is typically fractional. In a TCP implementation, the receive window size should be compared with the MSS prior to increasing the transmission frequency as the problem may not be with the connection, but rather at the destination. As such the timer decrease multiplier may also be dependent upon the difference between the size of the data available to send and the size of the data block outlined by the upper threshold.

If the client pointer is not in the upper zone or the lower zone, then execution block 690 maintains the transmit timer interval relative to the base timer interval. As a result of dynamically adjusting the timer duration, the invention attempts to minimize overhead, in part by having useful data transmission work to do when the timer expires, and thereby maximize the efficiency of CPU resource utilization.

In one configuration, process 600 attempts to minimize the number of transmissions that are smaller than a connection's MSS. Execution block 690 determines whether a minimum transmit data size is available. A preferred configuration selects the transmit minimum from the smallest of the MSS, the available to send window, and the receive window. By not simply filling packets to the advertised window size from the TCP communication, one configuration is able to pace transmission of packets and avoid transmitting bursts of data at a higher rate. Pacing prevents the congestion that might be caused by traditional bursting methodologies and as such helps to avoid dropped packets due to insufficient buffering at some element in the communication channel between the source/switch and the client destination.

Figure 7:
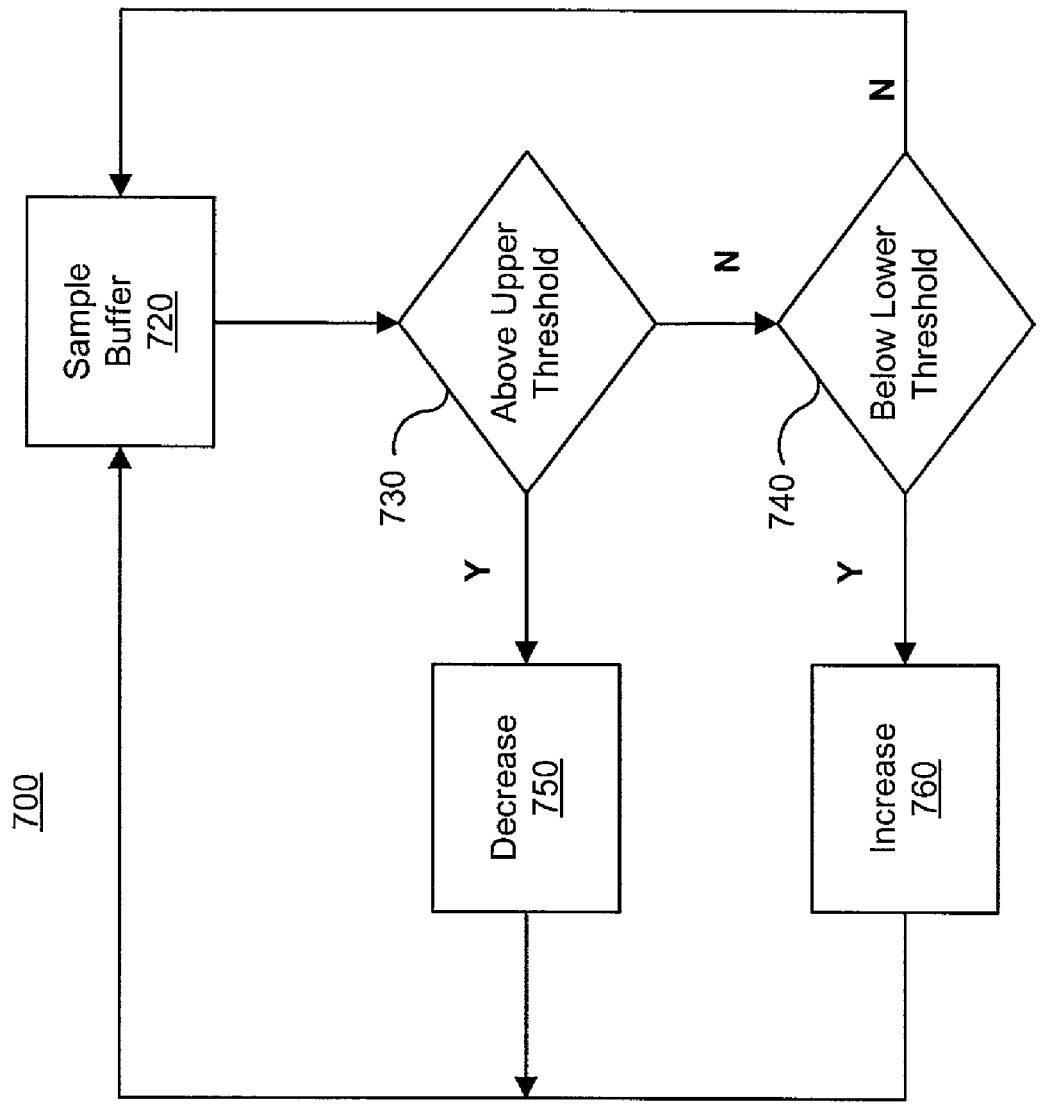
FIG. 7 is a flow chart for programming dynamic threshold-based timer adaptations.

FIG. 7 illustrates a process 700 for dynamically adapting the stream to improve performance based on the proximity of a client connection pointer relative to multiple thresholds. In the illustrated embodiment, the position of each client connection pointer within the buffer is monitored 720 and proximity is determined with regards to an upper threshold 730 and a lower threshold 740. As long as the client pointer stays between the thresholds, the process 700 maintains the transmission characteristics of the last transmission and continues to sample the buffer 720. When the pointer exceeds the upper threshold the lag time for delivery of data sent from the buffer is high, such that the buffer may be in danger of overflowing and potentially interrupting delivery of streaming data because the desired data has been overwritten or invalidated. The lower threshold is an indication that data delivery from the buffer is fast; in fact the buffer is being transmitted faster than it can be refilled. For example, if the pointer is below the lower threshold then the process 700 could increase the transmission frequency via execution block 750. While a pointer is above the upper threshold, execution block 760 is prompted to lower the transmission frequency to avoid overflow.

Figure 8:
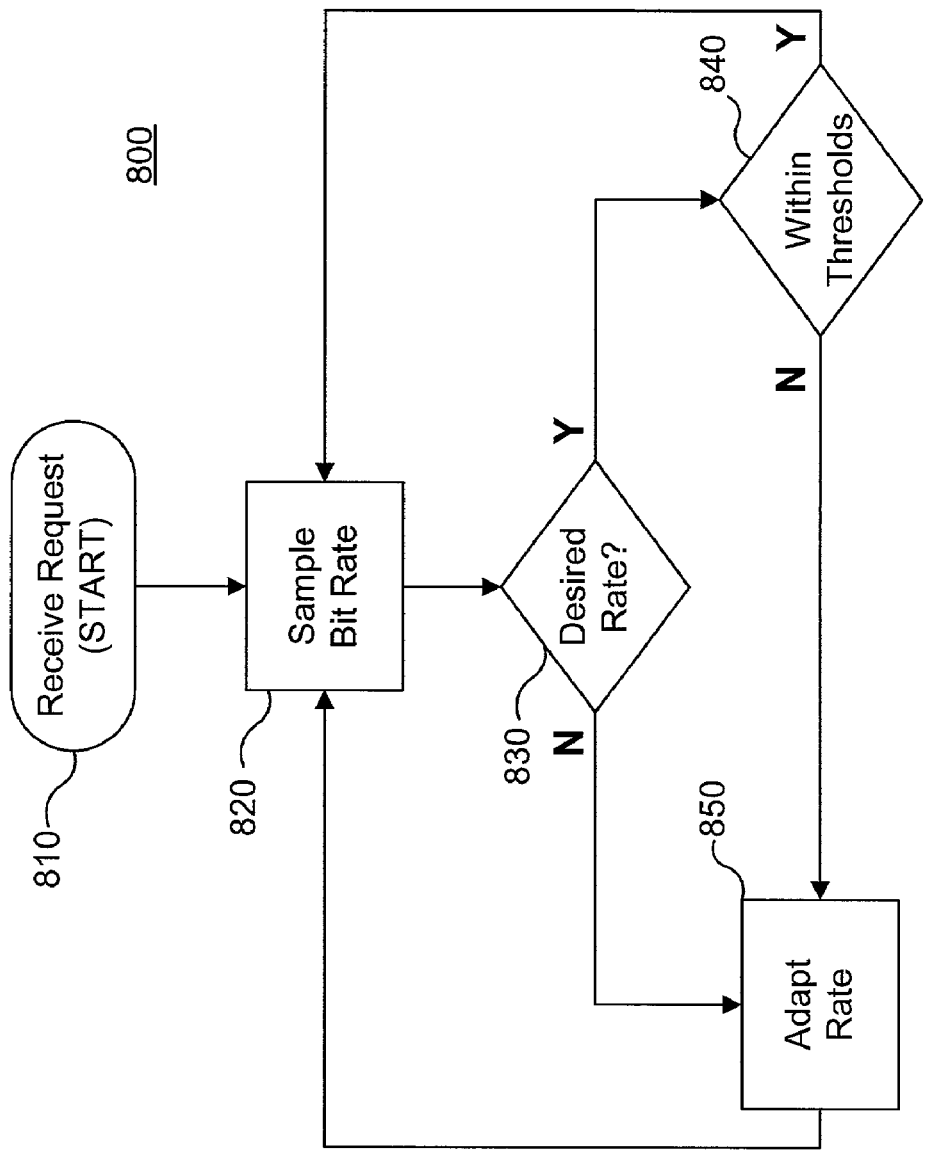
FIG. 8 is a flow chart describing programming for dynamic rate adaptation.

With reference to FIG. 8, process 800 for dynamically selecting timer duration is described according to an embodiment of the invention. The process 800 is initiated 810 upon transceiving a data request, such as a packet transmission or packet acknowledgement. Execution block 820 samples the bit rate. This sampling is accomplished by comparing transmitted data, the bit rate timer, and the desired bit rate. For example, an average transmission rate may be established by determining the amount of data sent divided by the time required to send it. In an alternative configuration, the sampling is determined at the source by comparing sent packets and acknowledged packets with a buffer. Similarly, a comparison between lag times of acknowledged packets and sent packets with a bit rate timer reveal a relative reception rate. Yet another configuration samples the bit rate only after receiving a connection event, such as a timer expiration event or reception of an acknowledgment packet from the destination.

Once the bit rate is determined, decision block 830 queries whether the bit rate is acceptable and decision block 840 queries whether the next data to be sent across the communication channel remains within acceptable thresholds of the buffer. If the bit rate is not within the prescribed speeds at decision block 830, then execution block 850 adapts the transmission frequency to change the bit rate so that it is acceptable. Criteria for determining whether the bit rate is acceptable depend largely on the configuration of the stream and the quality of the connection between the devices. In a network switch with a streaming media accelerator, these criteria are generally determined by the applications that transmit and receive the stream during the initial handshaking process with the destination. Although, criteria regarding the stream, such as the desired bit rate, are generally received from the source.

One method of adapting the transmission rate is to adapt the transmission frequency when the bit rate is less than the desired bit rate. For example, if the bit rate sampled in execution block 820 is less than the desired bit rate, then execution block 850 increases the transmission frequency. More specifically, if the bit rate is 128 Kbps and the MSS is 1400 bytes then the transmission frequency should be about 10 Hz. To increase the transmission rate the process 800 must either increase the amount of data sent within each packet, increase the frequency of transmission, or a combination of the two methods. As previously discussed, there are various advantages and disadvantages to each method. For example increasing the packet size may overload intervening network devices between the source and destination and thus be rejected, for the packets to be resent. Increasing the frequency may actually contribute to a network congestion problem, further increasing the delivery delay. An exemplary adaptation process is more fully described in reference to FIG. 9.

Once decision block 830 determines that the bit rate is acceptable, decision block 840 queries whether the transmission is within acceptable usage thresholds. Execution block 850 adapts the stream when buffer utilization is outside of the thresholds. In one embodiment, the process 800 determines the buffer utilization with respect to the threshold and changes the stream to ensure performance. For example, if the sent data indicator is below a threshold then execution block 850 adapts the stream to increase data delivery until the sent data is above the threshold. This adaptation process is more fully described in reference to FIG. 10. Finally, if decision block 840 determines that relative performance is acceptable then process 800 returns to execution block 820 to continue monitoring the bit rate and stream.

Figure 9:
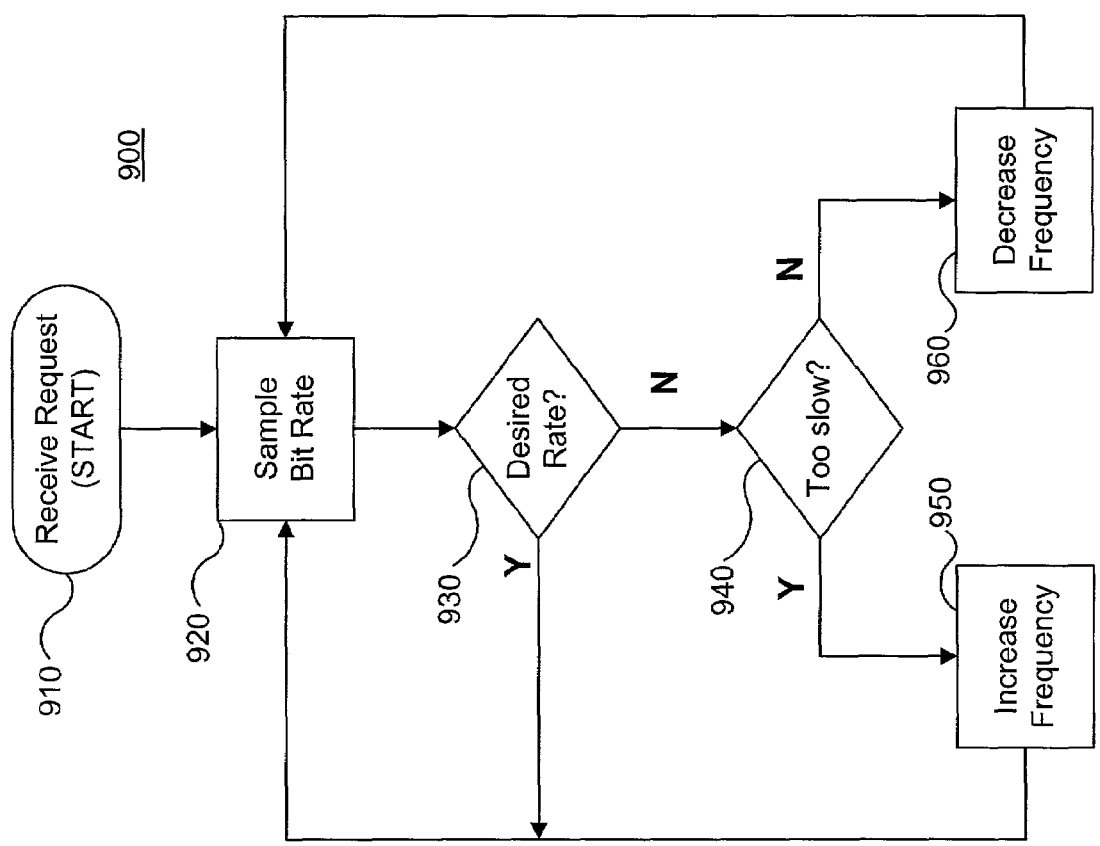
FIG. 9 is a flow chart describing rate-based programming of transmission frequency.

FIG. 9 illustrates process 900 for adjusting the transmission frequency to maintain a desired bit rate. Upon initiating a dynamic stream 910, execution block 920 samples stream bit rates. So long as the stream is delivering the desired bit rate decision block 930 directs the process 900 to continue sampling the stream. If the bit rate falls outside of the desired parameters, decision block 940 determines whether the bit rate is too slow. If the bit rate is not too slow execution block 960 decreases the transmission frequency; otherwise execution block 950 increases the transmission frequency. As previously discussed there are many acceptable ways known to one of skill in the art for changing the transmission frequency. For example, altering the base timer, thereby adjusting the spacing between transmissions, can change the transmission frequency and the delivery rate of the data in the packets. Upon changing the transmission frequency both execution blocks 950 and 960 return process 900 to execution block 920 and continues sampling the stream.

Figure 10:
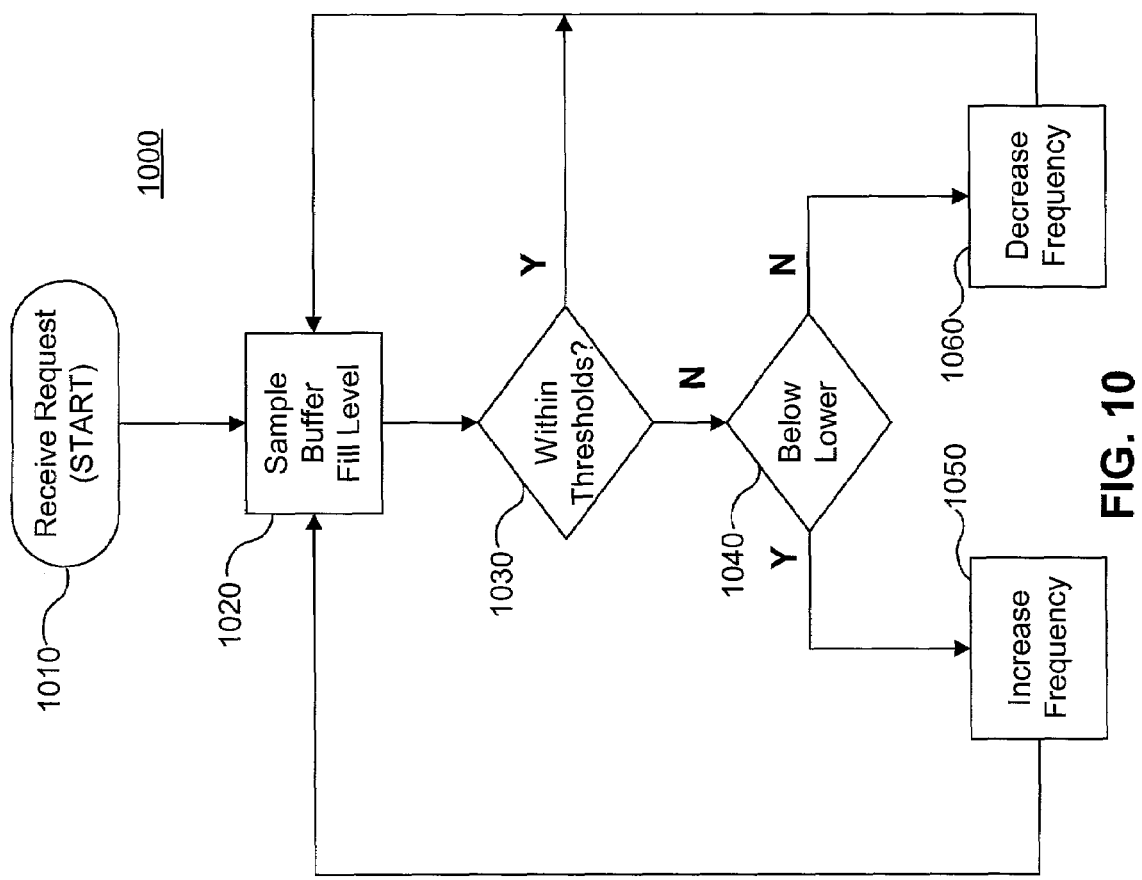
FIG. 10 is a flow chart for threshold-based programming of transmission frequency.

FIG. 10 illustrates a process 1000 for dynamically adapting the stream to improve performance based on delivery of data to a destination via a communication connection or channel. Performance is determined in part by the relative distance of requested data to various thresholds. In the illustrated embodiment, the buffer being monitored 1020 contains an upper threshold and a lower threshold; however, multiple thresholds are incorporated through addition query blocks positioned after query block 1040. In the illustrated process 1000, the upper threshold indicates that delivery of data from the buffer is too fast and that the buffer may be in danger of being drained faster than it can be filled. The lower threshold is an indication that utilization of the buffer is slow; in fact the buffer risks overflowing and potentially invalidating the data in the buffer. If decision block 1030 determines that the fill level is within the thresholds, the process 1000 continues to sample the bit rate. However, once the bit rate falls outside of the thresholds, decision block 1040 determines which threshold has been exceeded and responds accordingly. For example, if utilization is below the lower threshold then the process 1000 could increase the transmission frequency via execution block 1050. While buffer utilization is above the upper threshold, execution block 1060 is prompted to lower the transmission frequency to avoid overflow.

In summary, the present invention relates to data communication systems that dynamically select timer durations to deliver data at a desired bit rate. Thus, a preferred embodiment of the present invention provides a source (i.e., server) that transmits data, such as streaming media, to a destination (i.e., a client) according to a dynamic bit rate timer, where the timer regulates the transmission frequency and/or the packet size of the data being transmitted. The timer may dynamically adapt the transmission frequency according to the utilization of a buffer. The buffer is configured to deliver the data to multiple destinations via a communications network, such as the Internet. By changing the transmission frequency or packet size the timer effectively changes the rate of data delivery and preferably may make adjustments to maintain a desired average bit rate. The buffer may also employ thresholds and data pointers to monitor, optimize performance, and indicate the overall utilization of the buffer. Based in part on buffer conditions and connection performance, the timer dynamically adjusts the stream. More specifically, when the buffer utilization exceeds a threshold, the transmission frequency or the packet sizes are increased or decreased as needed. In this way, the present invention dramatically increases the chances that data will be available at a desired bit rate without interruptions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A network switch for transmitting streaming data to a plurality of destinations, each of the destinations having a separate streaming connection to the network switch, the network switch comprising:

a receiver to receive a unicast stream at a desired rate;

a circular buffer having a first threshold and a second threshold to buffer the unicast stream and to split the unicast stream into multiple unicast streams;

a timer to determine a transmission rate based in part on a desired rate, an average bit rate for each connection, and a maximum segment size (MSS) for each connection, the transmission rate regulating transmission of the multiple unicast streams to multiple client destinations;

a stream-processing module in communication with the timer and the buffer, the stream-processing module to generate a data pointer to a next segment of streaming data in the buffer for each of the destinations, monitor utilization of the buffer relative to the first and second thresholds for each connection, and send timing signals to the timer; and wherein the timer further to increase the transmission rate for a particular connection if buffer utilization for that connection falls below the first threshold, and to reduce the transmission rate for a particular connection if buffer utilization for that connection exceeds the second threshold.

2. The network switch of claim 1, wherein the timer dynamically determines the transmission rate according to the relative positioning of data pointers to streaming data in the circular buffer.

3. The network switch of claim 2, wherein the stream-processing module updates the relative position of data pointers associated with each destination after a transmission event.

4. The network switch of claim 1, wherein the timer adjusts the transmission rate of streaming data to the destination midstream based in part upon usage of the buffer by each destination.

5. A method comprising:
receiving from a source a unicast stream at a Streaming Media Accelerator (SMA) enabled switch at a desired rate;
buffering the unicast stream at the SMA enabled switch with a circular buffer having a first threshold and a second threshold;
splitting the unicast stream at the SMA enabled switch into multiple unicast streams;
transmitting the multiple unicast streams to multiple client destinations at a transmit rate upon receipt of timer events, each client destination having a separate connection with the SMA enabled switch and wherein the transmit rate is determined based at least in part on the desired rate, an average bit rate for each connection, and a Maximum Segment Size (MSS) for each connection;
monitoring utilization of the circular buffer relative to the first and second thresholds for each connection;
upon recognizing that buffer utilization falls below the first threshold for a particular connection, increasing the transmit rate for that connection; and
upon recognizing that buffer utilization exceeds the second threshold, reducing the transmit rate for that connection.

6. The method of claim 5, wherein a timer event is an expiration of a timer interval.

7. The method of claim 5, wherein a timer event is reception of an acknowledgment packet from the client destination.

8. The method of claim 5, wherein increasing the transmit rate comprises multiplying the transmit rate by a timer multiplier.

9. The method of claim 5, wherein data is received from the source via a packet switched connection.

10. The method of claim 5, wherein the connection is a TCP/IP connection.

11. The method of claim 5, wherein the source is a server.

12. The method of claim 5, wherein the source is a network switch.

13. The method of claim 5, wherein the destination is a client computer.

14. The method of claim 5, wherein the unicast stream is streaming media.

* * * * *